(12) United States Patent
Naito et al.

(10) Patent No.: US 6,529,367 B1
(45) Date of Patent: Mar. 4, 2003

(54) NIOBIUM CAPACITOR AND METHOD OF MANUFACTURE THEREOF

(75) Inventors: Kazumi Naito, Chiba (JP); Atsushi Shimojima, Tokyo (JP)

(73) Assignee: Showa Denko Kabushiki Kaisha, Tokyo (JP)

(*) Notice: Subject to any disclaimer, the term of this patent is extended or adjusted under 35 U.S.C. 154(b) by 0 days.

(21) Appl. No.: 09/868,226

(22) PCT Filed: Dec. 13, 1999

(86) PCT No.: PCT/JP99/06971
§ 371 (c)(1),
(2), (4) Date: Jun. 15, 2001

(87) PCT Pub. No.: WO00/36617
PCT Pub. Date: Jun. 22, 2000

Related U.S. Application Data

(60) Provisional application No. 60/117,306, filed on Jan. 26, 1999, and provisional application No. 60/115,486, filed on Jan. 11, 1999.

(30) Foreign Application Priority Data

Dec. 15, 1998 (JP) .......................................... 10-355767
Dec. 22, 1998 (JP) .......................................... 10-363883

(51) Int. Cl.$^7$ .............................. H01G 9/00; H01G 9/02
(52) U.S. Cl. ........................ 361/524; 361/311; 361/525
(58) Field of Search ................................ 361/523–541, 361/311–313

(56) References Cited

U.S. PATENT DOCUMENTS

| | | |
|---|---|---|
| 4,084,965 A | 4/1978 | Fry |
| 4,954,169 A | 9/1990 | Behrens |
| 5,448,447 A | 9/1995 | Chang |

FOREIGN PATENT DOCUMENTS

| | | |
|---|---|---|
| GB | 1 219 748 | 1/1971 |
| JP | 48-57159 | 8/1973 |
| JP | 53-83064 | 7/1978 |
| JP | 60 121207 | 6/1985 |
| JP | 3-150822 A | 6/1991 |
| JP | 5-9710 | 1/1993 |
| JP | 5-9790 A | 1/1993 |
| JP | 6-53088 | 2/1994 |
| JP | 10-242004 | 9/1998 |
| WO | WO 98/19811 | 5/1998 |

OTHER PUBLICATIONS

"Reactions During Sintering of Niobium Powder from Aluminothermic Reduction Product," *R&HM*, Dec. 1985, vol. 4, pp. 189–194.

"The Influence of Gas Atmosphere on the First–Stage Sintering of High–Purity Niobium Powders", *Metallurgical Transactions*, M. Krehl et al., vol. 15A, Jun. 1984, pp. 1111–1116.

*Primary Examiner*—Dean A. Reichard
*Assistant Examiner*—Eric Thomas
(74) *Attorney, Agent, or Firm*—Sughrue Mion, PLLC

(57) ABSTRACT

A capacitor having a large capacity per unit weight and good LC characteristics is provided, which includes two electrodes and a dielectric interposed between the two electrodes, and the dielectric has a two-layer structure including a first layer predominantly niobium oxide $NbO_x$ (X=2.5) and a second layer predominantly having a mixture of niobium oxide $NbO_x$ (X=2.5) and niobium oxide $NbO_x$ (X=2.0). Preferably, both the first and second layers contain 90 weight % or more of $NbO_x$, and the molar ratio of $NbO_x$ (X=2.5) to $NbO_x$ (X=2.0) in the second layer is 1:4 to 4:1, and the proportion of the first layer in the two-layer structure is 0.01 to 10% by volume. One of the electrodes preferably includes partially nitrided niobium, and more preferably partially nitrided niobium prepared by partially nitriding a niobium sintered body.

24 Claims, No Drawings

NIOBIUM CAPACITOR AND METHOD OF MANUFACTURE THEREOF

This application claims the benefit of earlier applications based on U.S. patent application Ser. No. 60/117306 filled on Jan. 26, 1999 and U.S. patent application Ser. No. 60/115486 filed on Jan. 11, 1999.

TECHNICAL FIELD

This invention relates to a capacitor having a large capacity per unit weight and good leakage current (hereinafter abbreviated to as "LC") characteristics.

BACKGROUND ART

By virtue of advancement in the downsizing or higher integration of IC or printed board in recent years, compact and lightweight electronic instruments such as a portable telephone, a laptop personal computer and an electronic memorandum book, have come into wide use. To cope with this tendency, development of capacitors having a small size and a large capacity is being eagerly desired for use in these electronic instruments.

Among the capacitors used in this field, a tantalum electrolytic capacitor is widely used because it has a large capacity for the size and exhibits good performance. In this tantalum electrolytic capacitor, tantalum oxide is used for the dielectric material.

In order to more increase the capacity of a capacitor, development of niobium or titanium capacitors using niobium oxide or titanium oxide having a higher dielectric constant than the tantalum oxide for the dielectric material is being encouraged. However, the capacitors using niobium oxide or titanium oxide for the dielectric material have unsatisfactory LC characteristics and poor practicality, thus, they are still in need of improvements.

DISCLOSURE OF THE INVENTION

An object of the present invention is to provide a niobium capacitor provided with a niobium oxide dielectric having good dielectric properties, which capacitor has a large capacity per unit weight and good LC characteristics.

Another object of the present invention is to provide a process for producing a niobium capacitor having a large capacity per unit weight and good LC characteristics, and exhibiting uniform LC value.

The present inventors have found that the poor LC characteristics of the niobium capacitor provided with a niobium oxide dielectric are, as one of causes, due to the excessive or deficient amount of oxygen bound to niobium constituting the niobium oxide. The present invention has been accomplished based on this finding.

In accordance with the present invention, there is provided a capacitor comprising two electrodes and a dielectric interposed between the two electrodes, characterized in that the dielectric has a two-layer structure comprising a first layer predominantly comprised of niobium oxide $NbO_x$ (X=2.5) and a second layer predominantly comprised of a mixture of niobium oxide $NbO_x$ (X=2.5) and niobium oxide $NbO_x$ (X=2.0).

In accordance with the present invention, there is further provided a process for producing a capacitor comprising two electrodes, one of which Is comprised of a sintered body of partially nitrided niobium, and a dielectric interposed between the two electrodes, characterized in that a compact of powdery niobium is sintered and then the thus-obtained niobium sintered body is allowed to stand in a nitrogen atmosphere to partially nitride the niobium sintered body.

BEST MODE FOR CARRYING OUT THE INVENTION

In the niobium capacitor of the present invention, the dielectric interposed between two electrodes is a dielectric having a two-layer structure comprising a first layer predominantly comprised of niobium oxide $NbO_x$ (X=2.5) and a second layer predominantly comprised of a mixture of niobium oxide $NbO_x$ (X=2.5) and niobium oxide $NbO_x$ (X=2.0).

In general, if the structure of niobium oxide is expressed by the formula: $NbO_x$ (x represents a molar ratio of oxygen bonded to niobium), those where x is 0.9, 1.0, 1.1, 2.0 and 2.5 are known. Niobium oxides having such a bonding value in this structure are identified by the X-ray photoelectric spectroscopic analysis. As preferable examples of niobium oxide $NbO_x$ (x=2.5) and niobium oxide $NbO_x$ (x=2.0), there can be mentioned $Nb_2O_5$ and $NbO_2$, respectively.

When the dielectric in a capacitor is constituted by a two layer structure having a first layer predominantly comprised of niobium oxide $NbO_x$ (X=2.5) and a second layer predominantly comprised of a mixture of niobium oxide $NbO_x$ (X=2.5) and niobium oxide $NbO_x$ (X=2.0), among niobium oxides, the capacitor has a very low LC value. The reason therefor is not yet completely elucidated, however, the poor LC characteristics are presumed to result because when a dielectric is predominantly comprised of niobium oxide, which does not have the above-described two-layer structure, oxygen in the dielectric material moves from the dielectric side to the electrode side or internal oxygen adsorbed on the electrode moves from the electrode side to the dielectric side, and due to this moving of oxygen, the characteristics of the dielectric itself become unstable, leading to an increase of the LC value. On the other hand, when a niobium oxide dielectric having the above-descried two-layer structure is used as dielectric, it is considered that the movement of oxygen, even if it occurs, takes place inside the dielectric material and the state is seemingly equilibrated, as a result, characteristics of the dielectric itself can be stabilized.

By the term "predominantly comprised of" used in the niobium oxide dielectric used in the present invention, we mean that niobium oxide $NbO_x$ (X=2.5) occupies at least 60% by weight of the first layer, and the mixture of niobium oxide $NbO_x$ (X=2.5) and niobium oxide $NbO_x$ (X=2.0) occupies at least 60% by weight of the second layer. The LC value of a capacitor is preferably 1 $\mu A$ or less. In order to keep the LC value at 1 $\mu A$ or less, the content of $NbO_x$ (x=2.5) in the niobium oxide of the first layer and the content of the mixture of $NbO_x$ (x=2.5) and $NbO_x$ (x=2.0) in the second layer each should preferably be at least 90% by weight, more preferably at least 95% by weight.

To produce a capacitor having a more reduced LC value, the ratio of niobium oxide $NbO_x$ (X=2.5) to niobium oxide $NbO_x$ (X=2.0), contained in the second layer of the dielectric, is preferably in the range of 1:4 to 4:1 by mole, more preferably from 1:3 to 3:1 by mole; and the content of the first layer in the two-layer structure Is preferably in the range of 0.01% to 10% by volume, especially 0.04% to 3% by volume, based on the volume of the second layer.

For forming the niobium oxide dielectric layer having the above-mentioned two-layer structure, for example, there can be employed a method of depositing a niobium complex such as niobium-containing alkoxy complex or acetyl acetonate complex onto an electrode, and thermally decomposing and/or hydrolyzing the deposited niobium complex; or, in the case of using niobium or partially nitrided niobium for the electrode, which will be described later, a method of electrolytically oxidizing the niobium electrode or the partially nitrided niobium electrode, or a method of depositing a niobium complex, as mentioned above, onto the niobium electrode or the partially nitrided niobium electrode and thermally decomposing and/or hydrolyzing the deposited niobium complex. Depending on the case, these methods may be used in combination.

In the case where the niobium oxide dielectric is made by electrolytically oxidizing the niobium electrode or the partially nitrided niobium electrode, the capacitor of the present invention is an electrolytic capacitor wherein the niobium electrode or the partially nitrided niobium electrode assumes anode. In the case where the niobium oxide dielectric is made by decomposing a niobium complex on the niobium electrode or the partially nitrided niobium electrode, the electrode is theoretically free of polarity and may assume either anode or cathode.

For the electrolytic oxidation of the niobium electrode or the partially nitrided niobium electrode, an aqueous protonic acid solution, for example, a 0.1% aqueous phosphoric acid solution or a 0.1% aqueous sulfuric acid solution is usually used. When the niobium oxide dielectric is made by the method of thermally decomposing and/or hydrolyzing a niobium-containing complex, the conditions such as the kind and concentration of the niobium complex, the decomposition temperature, the decomposition time and the kind and concentration of gas in the decomposition atmosphere, or by the method of electrolytically oxidizing the niobium electrode or the partially nitrided niobium electrode, the conditions such as the kind and shape of the electrode used, the kind and concentration of the electrolytic solution, and the electrolysis temperature and time, must be determined by previously examining an X-ray photoelectron spectroscopic diagram of the dielectric, obtained in a preliminary test. This is because the value X in the formula $NbO_x$ varies depending upon the above-recited conditions.

In general, there is a tendency that as the decomposition temperature is higher, as the decomposition time is longer, as the oxygen gas concentration in the gas of decomposition atmosphere is higher, as the concentration of the electrolytic solution is higher, as the electrolytic temperature is higher or as the decomposition time Is longer, the value x of niobium oxide $NbO_x$ obtained is lager.

The dielectric used in the present invention exhibits the desired function provided that it is interposed between the two electrodes. The shape and other structural features are not particularly limited. The thickness of the dielectric must not be uniform. The dielectric may have a part of complicated shape such that the electrodes are combined therewith in an intricate configuration.

As examples of the material for one electrode used in the capacitor of the present invention, there can be mentioned aluminum, tantalum, titanium, niobium, niobium nitride obtained by nitriding a part of niobium, and alloys of these metals.

Examples of the electrode shape include sheet, foil, bar and sintered body. The size of the capacitor is determined depending upon the required capacity of the capacitor. In the case of sheet, foil or bar, the electrode is used after bending or coiling it to increase the surface area per unit area. In the case of a sintered body, the electrode may be formed by compacting fine powder of the above-described metal under pressure and sintering the thus-prepared compact at a temperature of from 500° C. to 2,000° C. and a reduced pressure of from $10^0$ Torr to $10^{-6}$ Torr for from several minutes to several hours.

Niobium or partially nitrided niobium is preferably used as the electrode material, because a capacitor having a large capacity per unit weight is obtained. Especially the partially nitrided niobium is more preferably used, because good LC characteristics are additionally obtained. Accordingly, a niobium capacitor having an electrode comprised of partially nitrided niobium Is suitably used as a circuit capacitor required to have a high voltage and a low LC.

The partially nitrided niobium is obtained by partially nitriding niobium, for example, in a nitrogen atmosphere. The content of bound-nitrogen in the partially nitrided niobium varies depending on the shape of the niobium metal, however, in the case of powder having a particle diameter of approximately 30 $\mu$m or smaller, it is in the range of from 10 ppm to 200,000 ppm, preferably from 10 ppm to 150,000 ppm and more preferably 100 ppm to 10,000 ppm by weight, based on the weight of the partially nitrided niobium.

The reaction temperature for nitriding is not particularly limited, however, partially nitrided niobium having a necessary bound-nitrogen content may be industrially obtained by nitriding at a temperature of from room temperature to 2,000° C., preferably from 250 to 2,000° C. for approximately from 1 to 50 hours. In general, as the temperature is higher, the surface can be nitrided within a shorter time. Even at a low temperature of about room temperature, when fine powder of niobium metal Is left standing for tens of hours or longer in a nitrogen atmosphere, partially nitrided niobium having a necessary bound-nitrogen content of from tens of ppm to hundreds of ppm can be obtained.

In the case where an electrode comprised of a partially nitrided niobium sintered body is made, there can be employed a method of partially nitriding a niobium powder or its compact and then sintering the partially nitrided niobium, and a method of sintering a compact of niobium powder and then partially nitriding the niobium sintered body. The latter method of conducting first sintering and then nitriding is preferable because capacitors having uniform LC values can be obtained. That is, when a niobium powder is first partially nitrided and then the partially nitrided niobium is sintered according to the former method, the microstructure of the resulting electrode is sometimes not uniform due to heating of partially nitrided niobium upon sintering. In contrast, when a compact of niobium powder is first sintered and then the sintered body is partially nirided, the resulting electrode has a uniform microstructure and the non-uniformity of LC values of capacitors is reduced.

A sintered body of non-nitrided niobium may be obtained, for example, by sintering a compact of powdery niobium at a high temperature in vacuum. More specifically, powdery niobium is molded into a compact and then the compact is allowed to stand under a reduced pressure of from $10^{-1}$ to $10^{-6}$ Torr at a temperature of from 1,000 to 2,000° C. for from a few minutes to several hours. The sintering temperature generally varies depending on the particle diameter of powdery niobium and as the particle diameter is smaller, a lower temperature may be used.

The conditions under which a niobium sintered body is partially nitrided, and the content of bound-nitrogen in the partially nitrided niobium may be the same as those mentioned as for partially nitriding of powdery niobium. In general, a niobium sintered body having an objective content of bound-nitrogen can be obtained by partially nitriding at a temperature of 2,000° C. or lower for a time of tens of hours. In general, nitriding at a higher temperature may be completed within a shorter time. Even at room temperature, when the niobium sintered body is left standing for tens of hours in a nitrogen atmosphere, a niobium sintered body having a bound-nitrogen content of hundreds of ppm by weight can be obtained. By introducing nitrogen under pressure, the nitriding time can be shortened. On the contrary, when nitrogen is introduced under reduced pressure, the nitriding time is prolonged. For example, if the niobium sintered body is left standing under extremely reduced pressure, e.g., $\frac{1}{100}$ Torr, nitriding scarcely takes place within an industrially acceptable time of tens of hours.

As mentioned above, capacitors having an electrode comprised of partially nitrided niobium sintered body, which has been prepared by a method of conducting first sintering and then nitriding, exhibit reduced non-uniformity of LC values. This effect of reduction in non-uniformity of LC values is found not only when the dielectric of the capacitors is comprised of niobium oxide, but also when the dielectric is comprised of other materials such as tantalum oxides, polymeric materials and ceramic materials. As examples of such materials used for the dielectric, other than niobium oxide, there can be mentioned tantalum oxide derivatives such as those which are prepared by depositing a tantalum-containing complex, for example, an alkoxy complex of tantalum or an acetylacetonate complex of tantalum, to the electrode and then hydrolyzing and/or thermally decomposing the deposited complex; polymeric materials which include, for example, fluororesins, alkyd resins, acrylic resins, polyester resins such as polyethylene terephthalate, vinyl resins, xylylene resins and phenolic resins; and ceramic dielectric materials which include, for example, perovskite-type compounds such as $BaTiO_3$, $SrTiO_3$ and $BaSnO_3$, formed on the surface of a metal having pores or voids as described, for example, in JP-A 7-63045.

The other electrode in the capacitor of the present invention is not particularly limited. For example, at least one compound selected from electrolytic solutions, organic conducting materials derived from organic semiconductors and inorganic conducting materials derived from inorganic semiconductors, which are known in the art of aluminum electrolytic capacitors, may be used. At least one organic semiconductor or inorganic semiconductor is preferably used for the other electrode, which preferably has an electrical conductivity of from $10^{-2}$ S·cm$^{-1}$ to $10^3$ S·cm$^{-1}$. When an organic or inorganic semiconductor having an electrical conductivity of from $10^{-2}$ S·cm$^{-1}$ to $10^3$ S·cm$^{-1}$ is used, the impedance value of a capacitor can be more reduced and the capacity thereof at a high frequency can be more enhanced.

Examples of the organic semiconductor include an organic L semiconductor comprising benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer represented by the following general formula (1) or (2):

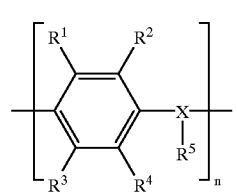

(1)

(wherein $R^1$ to $R^4$ each represents hydrogen, an alkyl group having 1 to 6 carbon atoms or an alkoxy group having 1 to 6 carbon atoms, X represents an oxygen atom, a sulfur atom or a nitrogen atom, $R^5$ is present only when X is a nitrogen atom and represents hydrogen or an alkyl group having 1 to 6 carbon atoms, and $R^1$ and $R^2$ or $R^3$ and $R^4$ may be combined with each other to form a ring together with the carbon atoms on the benzene ring, to which $R^1$ and $R^2$ or $R^3$ and $R^4$ are bound.

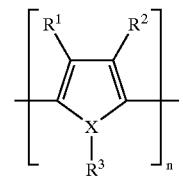

(2)

(wherein $R^1$ and $R^2$ each represents hydrogen, an alkyl group having 1 to 6 carbon atoms or an alkoxy group having 1 to 6 carbon atoms, X represents an oxygen atom, a sulfur atom or a nitrogen atom, $R^3$ is present only when X is a nitrogen atom and represents hydrogen or an alkyl group having 1 to 6 carbon atoms, and $R^1$ and $R^2$ may be combined with each other to form a ring together with the carbon atoms on the five-membered ring, to which $R^1$ and $R^2$ are bound.).

As specific examples of the electrically conducting polymer represented by formula (1) or (2), there can be mentioned polyaniline, polyoxyphenylene, polyphenylenesulfide, polythiophene, polyfuran, polypyrrole and polymethylpyrrole.

Examples of the inorganic semiconductor include an inorganic semiconductor mainly comprising lead dioxide or manganese dioxide, and an inorganic semiconductor comprising triiron tetroxide.

These semiconductors may be used either alone or in combination of two or more thereof.

In the case when the other electrode is a solid, a capacitor can be fabricated, for example, by sequentially laminating a carbon paste and a silver paste on the other electrode and encapsulating the laminate with a material such as epoxy resin This capacitor may have a niobium or tantalum lead which is formed by sintering together with the niobium sintered body or by afterward welding. In the case where the other electrode is a liquid, a capacitor can be fabricated, for example, by housing a structure comprising the above-mentioned electrode and a dielectric in a can electrically connected to the other electrode. In this case, the partially nitrided niobium sintered body electrode side is guided outside through the niobium or tantalum lead and at the same time, designed to be insulated from the can and the other electrode by using an insulating rubber or other insulating materials. In the capacitor, there may be present a portion where the dielectric is incompletely connected to the electrode, i.e., the dielectric material is partly not in contact with the electrode.

The present invention will now be more specifically described by the following examples.

Characteristics of powdery niobium, a niobium sintered body and a capacitor were determined by the following methods.

(1) Average Particle Diameter of Powder

Average particle diameter (unit: μm) of a niobium powder was expressed by a particle diameter value $D_{50}$ as determined at a cumulative weight of 50% by a particle size distribution analyzer (tradename "Microtrack").

(2) Content of Bound-Nitrogen

The content of bound-nitrogen in a niobium powder or a niobium sintered body was determined by using an oxygen-nitrogen analyzer (available from LECO Co.) measuring a nitrogen content based on the thermal conductivity.

(3) Capacity of Capacitor

Capacity (unit: μF) of a capacitor was determined at a frequency of 120 Hz in Examples 1 to 15 or 100 kHz in Examples 16 to 36 by an LCR measuring device (available from HP Co.), a terminal of which was directly connected to an electrode of the capacitor.

(4) Leakage Current (LC) Value of Capacitor

Leakage current (LC) value (unit: μA) of a capacitor was measured by a leakage current measuring device, a terminal of which was directly connected to an electrode of the capacitor, when one minute elapsed while a voltage of 4 V was imposed. The LC value was measured on 20 capacitors and expressed by an average value.

(5) Non-uniformity (2 σ) of Leakage Current Value

Average value and standard deviation (σ) of LC values were determined for 20 specimens, and non-uniformity of LC value was expressed by a doubled standard deviation value (2 σ).

EXAMPLE 1

To the center of a tantalum foil having a width of 7 mm, a length of 120 mm and a thickness of 100 μm, a part (2 mm portion) of a tantalum lead having a diameter of 0.3 mm and a length of 10 mm was welded. Then, the tantalum lead was coiled and joined to form an electrode.

Separately, a 3% toluene solution of pentapropyl niobate (niobium complex) was prepared and the electrode obtained above was dipped in the solution while not dipping the 7 mm portion from the top of the tantalum, pulled up and then treated at 200° C. for 3 hours in an air atmosphere, subsequently at 85° C. for 1 hour in a steam atmosphere and further at 500° C. for 1 hour in a nitrogen atmosphere. The dipping in the niobate solution and subsequent heat treatment were repeated to form a dielectric comprised of niobium oxide on the electrode. The X-ray photoelectron spectroscopic analysis revealed that the niobium oxide dielectric comprised a first layer comprising 99% by weight of $NbO_x$ (x=2.5) and a second layer comprising at least 99% by weight of a mixture of $NbO_x$ (x=2.5) and $NbO_x$ (x=2.0) [molar ratio of $NbO_x$ (x=2.5):$NbO_x$ (x=2.0) was 3:2], the first layer being superposed upon the second layer (the ratio of the first layer to the second layer was 0.4% by volume).

Thereafter, the electrode was in sequence dipped in a pyrrole solution and in an aqueous solution of a mixture of ammonium persulfate and toluenesulfonic acid. This dipping operation was repeated to form a polypyrrole layer on the dielectric. Furthermore, the electrode was in sequence dipped in carbon paste and in silver paste and then dried, thereby laminating the pastes. To the resulting electrode, a cathode lead was fixed and the whole was encapsulated with an epoxy resin to fabricate a capacitor. The capacity and LC value of the capacitor obtained were measured. The results are shown in Table 3.

EXAMPLE 2

About 0.1 g of powdery niobium having a particle diameter distribution of from 10 to 30 μm and an average particle diameter of 14 μm was compacted together with a tantalum lead having a diameter of 0.3 mm and a length of 15 mm to obtain a compact having a size of 3 mm×3 mm×2 mm (the tantalum lead was buried in the compact by 2 mm and projected outside by 12 mm). The compact obtained was sintered at 1,500° C. in vacuum to form a niobium sintered body. Thereafter, chemical formation at 26 V in a 5% aqueous phosphoric acid solution was continued at room temperature for 5 hours, whereby a dielectric layer comprising niobium oxide was formed on the sintered body. The analysis of the thus-formed dielectric layer revealed that it had the composition shown in Table 2.

Thereafter, this electrode was repeatedly subjected to dipping in an aqueous manganese nitrate solution and then thermal decomposition of the thus-deposited solution to thereby form an inorganic semiconductor layer comprising manganese oxide on the dielectric layer. Subsequently, carbon paste and silver paste were laminated thereon in the same manner as in Example 1 and the whole was encapsulated with an epoxy resin to obtain a capacitor. The characteristics of the capacitor obtained are shown in Table 3.

EXAMPLE 3

The same niobium sintered body as that obtained in Example 2 was allowed to stand in a nitrogen atmosphere at 300° C. under normal pressure for 2 hours whereby a partially nitrided niobium sintered body having a bound-nitrogen content of about 2,000 ppm by weight was obtained. A capacitor was fabricated in the same manner as in Example 2 except that the partially nitrided niobium sintered body was used instead of the niobium sintered body. Capacity and LC value of the capacitor was evaluated. The results are shown in Table 3.

EXAMPLE 4

The same powdery niobium as used in Example 2 was previously partially nitrided in a nitrogen atmosphere at 500° C. to prepare powdery niobium nitride having a bound-nitrogen content of about 3,000 ppm by weight. Using this powdery niobium nitride, a capacitor was fabricated in the same manner as in Example 2. Characteristics of the capacitor are shown in Table 3.

EXAMPLE 5

A capacitor was fabricated in the same manner as in Example 4 except that powdery niobium having an average particle diameter of 3 μm was used and partial nitriding was carried out at a temperature of 400° C. Composition of a dielectric layer formed is shown in Table 2, and characteristics of the capacitor are shown in Table 3.

EXAMPLE 6

A capacitor was fabricated in the same manner as in Example 4 except that the conditions employed in Example 2 for the chemical formation of a sintered body were varied so that the sintered body was chemically formed in a 0.5% aqueous acetic acid solution while a voltage of 26 V was imposed for 10 hours. Composition of a dielectric layer formed is shown in Table 2, and characteristics of the capacitor are shown in Table 3.

EXAMPLES 7 to 11

Capacitors were fabricated in the same manner as in Example 1 except that a dielectric was formed under the conditions shown in Table 1 in place of performing the treatment for forming a dielectric at 200° C. for 3 hours in an air atmosphere, subsequently at 85° C. for 1 hour in a steam atmosphere and further at 500° C. for 1 hour in a nitrogen atmosphere in Example 1. Composition of a dielectric layer formed is shown in Table 2, and characteristics of the capacitor are shown In Table 3.

TABLE 1

Conditions for Formation of Dielectric Layer

| | |
|---|---|
| Example 7: | In air at 200° C. for 10 hours, in steam at 85° C. for 10 hours, and in nitrogen at 500° C. for 5 hours. |
| Example 8: | In air at 250° C. for 10 hours, in steam at 85° C. for 1 hour, and in nitrogen at 800° C. for 2 hours. |
| Example 9: | In air at 125° C. for 3 hours, in steam at 85° C. for 1 hour, and in nitrogen at 500° C. for 1 hours. |
| Example 10: | In nitrogen at 800° C. for 10 minutes. |
| Example 11: | In air at 80° C. for 50 hours. |

EXAMPLE 12

A capacitor was fabricated in the same manner as in Example 2 except that the conditions employed in Example 2 for the chemical formation of a sintered body were varied so that the sintered body was chemically formed in a 0.03% aqueous acetic acid solution while a voltage of 26 V was imposed for 30 minutes at room temperature. Composition of a dielectric layer formed is shown in Table 2, and characteristics of the capacitor are shown in Table 3.

TABLE 2

Composition of dielectric layer $NbO_x$

| | $X^{*1}$ in $NbO_x$ of first layer | Proportion of first layer in dielectric layer (% by volume) | In $NbO_x$ mixture$^{*2}$ of second layer, molar ratio of: (X = 2.5):(X = 2.0) | |
|---|---|---|---|---|
| Example 2 | 2.5 | 0.8 | 1 | 0.8 |
| Example 3 | 2.5 | 0.8 | 1 | 0.8 |
| Example 4 | 2.5 | 0.8 | 1 | 0.8 |
| Example 5 | 2.5 | 0.8 | 1 | 0.8 |
| Example 6 | 2.5 | 1.7 | 1 | 1.25 |
| Example 7 | 2.5 | 0.9 | 1 | 0.33 |
| Example 8 | 2.5 | 8.7 | 1 | 0.25 |
| Example 9 | 2.5 | 0.02 | 1 | 4 |
| Example 10 | 2.5 | 12 | 1 | 1.02 |
| Example 11 | 2.5 | 0.008 | 1 | 6$^{*3}$ |
| Example 12 | 2.5 | 1.2 | 1 | 5 |

Note
$^{*1}$Content of $NbO_x$ (X = 2.5) in first layer in Examples 1–12 is 99% by weight.
$^{*2}$Content of mixture of $NbO_x$ (X = 2.5) and $NbO_x$ (X = 2.0) in second layer in Examples 1–12 is 99% by weight.
$^{*3}$The second layer further contains about 75% by weight of $NbO_x$ (X = 1.0)

TABLE 3

| | Capacity ($\mu$F) | LC(4V) ($\mu$A) |
|---|---|---|
| Example 1 | 6 | 0.09 |
| Example 2 | 40 | 0.12 |

TABLE 3-continued

| | Capacity ($\mu$F) | LC(4V) ($\mu$A) |
|---|---|---|
| Example 3 | 42 | 0.03$^{*1}$ |
| Example 4 | 42 | 0.04$^{*2}$ |
| Example 5 | 136 | 0.07 |
| Example 6 | 42 | 0.08 |
| Example 7 | 6 | 0.11 |
| Example 8 | 6 | 0.48 |
| Example 9 | 6 | 0.54 |
| Example 10 | 6 | 1.1 |
| Example 11 | 6 | 1.4 |
| Example 12 | 40 | 2.5 |

Note
$^{*1}$Non-uniformity of LC value $2\sigma$ = 0.02
$^{*2}$Non-uniformity of LC value $2\sigma$ = 0.14

EXAMPLES 13 to 15

A plurality of chemically formed and sintered bodies, prepared in the same manner as in Example 4, (each dielectric layer was proved to have the same composition as in Example 2) were treated in the same chemical formation solution as in Example 4 while imposing a reverse voltage, thereby destroying the dielectric layer. Thereafter, these sintered bodies were left standing at 140° C. for a time period shown in Table 4 to restore a dielectric layer.

Capacitors were fabricated using the sintered bodies having the restored dielectric layer in the same manner as in Example 4. Composition of the dielectric layers and characteristics of the capacitors are shown in Table 4.

TABLE 4

| | Standing time (min) | Content of X = 2.5 in 1st layer$^{*1}$ (%) | Total content of X = 2.5 and X = 2.0 in 2nd layer$^{*2}$ (%) | Capacity ($\mu$A) | LC ($\mu$F) |
|---|---|---|---|---|---|
| Example 4 | — | 99 | 99 | 42 | 0.04 |
| Example 13 | 15 | 92 | 94 | 43 | 0.80 |
| Example 14 | 8 | 87 | 91 | 41 | 1.5 |
| Example 15 | 4 | 82 | 88 | 40 | 2.9 |

Note
$^{*1}$, $^{*2}$the remainder in each of the first layer and the second layer was $NbO_x$ (X = 1.0).

EXAMPLES 16 to 20

A compact (volume: about 3×3.5×1.8 mm) of powdery niobium having an average particle diameter of 3 $\mu$m was sintered at 1,220° C. under $10^{-6}$ Torr to obtain a plurality of sintered bodies. Each sintered body was nitrided under the conditions shown in Table 5 to obtain partially nitrided niobium sintered body. Then the partially nitrided niobium sintered body was chemically formed at 20 V in an aqueous phosphoric acid solution to produce a niobium oxide dielectric on the sintered body. The thus-formed dielectric was contacted at 40° C. twice or more times with an equivalent mixed solution of a 30% aqueous lead acetate solution and a 30% aqueous ammonium persulfate solution, thereby forming the other electrode comprising a mixture of lead dioxide and lead sulfate (content of lead dioxide: 97% by weight). Subsequently, a carbon paste and a silver paste were laminated in sequence on the other electrode and the laminate was encapsulated with an epoxy resin to manufacture a capacitor. Capacity, LC value, and non-uniformity (2 $\sigma$) of LC values of the capacitor are shown in Table 7.

TABLE 5

|  | Nitriding conditions | | | Content of nitrogen (ppm by weight) |
| --- | --- | --- | --- | --- |
|  | Temperature | Pressure | Standing time |  |
| Example 16 | Normal | Normal | 20 hours | 300 |
| Example 17 | 400° C. | Normal | 3 hours | 4,000 |
| Example 18 | 600° C. | Normal | 4 hours | 19,000 |
| Example 19 | 1,000° C. | Normal | 5 hours | 103,000 |
| Example 20 | 300° C. | Normal | 20 min. | 3,800 |

EXAMPLES 21 to 26

Capacitors were fabricated in the same manner as in Example 17 except that the compounds shown in Table 6 were used for the preparation of the other electrode in Example 17. Characteristics of each capacitor are shown in Table 7.

TABLE 6

|  | Other electrode and electrical conductivity (S – cm$^{-1}$) | Electrode-forming method |
| --- | --- | --- |
| Example 21 | Chloranile complex of tetra-thiotetracene, 2 × 10$^0$ | Repeatedly dipped in a solution of compound in the left column and dried |
| Example 22 | Chloranile complex of benzo-pyrroline oligomer, 5 × 10$^0$ | Repeatedly dipped in a solution of compound in the left column and dried |
| Example 23 | Dope of polypyrrole in toluenesulfonic acid, 5 × 10$^1$ | Repeated oxidation reaction in pyrrole solution |
| Example 24 | Dope of polyaniline in toluenesulfonic acid, 3 × 10$^1$ | Repeated oxidation reaction in aniline solution |
| Example 25 | Dope of polythiophene in toluenesulfonic acid, 4 × 10$^1$ | Repeated oxidation reaction in thiophene solution |
| Example 26 | Manganese dioxide 5 wt. % plus lead dioxide 95 wt. %, 5 × 10$^1$ | Thermal decomposition of manganese nitrate (repeated twice at 250° C.) and then repeated oxidation in lead acetate solution |

EXAMPLES 27 and 28 (Comparative Examples)

Capacitors were fabricated in the same manner as in Examples 16 and 21 except that the nitriding treatment of sintered body in Examples 16 and 21 was not carried out. Characteristics of each capacitor are shown in Table 7.

EXAMPLES 29 and 30 (Comparative Examples)

Capacitors were fabricated in the same manner as in Examples 18 and 19 except that a nitriding treatment was performed in the state of powdery niobium before the formation of sintered body in place of performing it after the formation of sintered body in Examples 18 and 19. Characteristics of each capacitor are shown in Table 7.

TABLE 7

|  | Capacity (100 kHz) ($\mu$F) | LC value ($\mu$A) | |
| --- | --- | --- | --- |
|  |  | Average | Non-uniformity (2σ) |
| Example 16 | 140 | 1.0 | 0.1 |
| Example 17 | 129 | 0.7 | 0.1 |
| Example 18 | 134 | 1.0 | 0.1 |
| Example 19 | 118 | 1.3 | 0.2 |
| Example 20 | 137 | 0.8 | 0.1 |
| Example 21 | 108 | 1.4 | 0.2 |
| Example 22 | 106 | 1.5 | 0.2 |
| Example 23 | 130 | 0.8 | 0.1 |
| Example 24 | 120 | 0.9 | 0.1 |
| Example 25 | 119 | 0.8 | 0.1 |
| Example 26 | 131 | 0.7 | 0.1 |
| Example 27*[1] | 139 | 36 | 4.8 |
| Example 28*[1] | 109 | 44 | 8.2 |
| Example 29*[1] | 130 | 2.6 | 1.0 |
| Example 30*[1] | 120 | 3.2 | 1.7 |

*[1]Comparative Example

EXAMPLE 31

A capacitor was fabricated in the same manner as in Example 18 except that a niobium oxide dielectric was formed not by chemical formation but by a process of dipping the sintered body in a pentaethyl niobate solution, pulling it up, allowing the sintered body to react in steam at 85° C., and then drying it at 350° C. Characteristics of the capacitor are shown in Table 8.

EXAMPLE 32

A capacitor was fabricated in the same manner as in Example 18 except that, in place of chemically forming the niobium oxide dielectric, a tantalum oxide dielectric was formed by a process of dipping a sintered body in an aqueous pentaethyl tantalate solution, pulling it up, allowing it to react in steam at 85° C. and then drying it at 450° C., and further except that an electrolytic solution comprising a mixed solution of ethylene glycol and dimethylformamide, having dissolved therein 5% of an isobutyltripropylammonium tetraborofluoride electrolyte was applied to the sintered body, the sintered body with the electrolyte was placed in a can, and the whole was encapsulated to manufacture a capacitor. Characteristics of the capacitor are shown in Table 8.

EXAMPLES 33 and 34 (Comparative Examples)

Capacitors were fabricated in the same manner as in Examples 27 and 28 except that the nitriding treatment of sintered body in Examples 27 and 28 was not performed. Characteristics of each capacitor are shown in Table 8.

EXAMPLES 35 and 36 (Comparative Examples)

Capacitors were fabricated in the same manner as in Examples 27 and 28 except that the nitriding treatment was performed in the state of powdery niobium before the formation of sintered body in place of performing it after the formation of sintered body in Examples 27 and 28. Characteristics of each capacitor are shown in Table 8.

TABLE 8

| | LC value (μA) | |
| --- | --- | --- |
| | Average | Non-uniformity (2σ) |
| Example 31 | 1.8 | 0.3 |
| Example 32 | 0.5 | 0.1 |
| Example 33*[1] | 53 | 9.6 |
| Example 34*[1] | 16 | 4.2 |
| Example 35*[1] | 4.0 | 1.7 |
| Example 36*[1] | 2.4 | 1.1 |

*[1]Comparative Examples

INDUSTRIAL APPLICABILITY

The capacitor of the present invention having a dielectric interposed between two electrodes, which has a two-layer structure comprised of a specific niobium oxide composition, has a large capacity per unit weight and good LC characteristics. When one of the two electrodes is comprised of niobium or partially nitrided niobium, the LC characteristics and other properties are improved. In the case when an electrode is made of partially nitrided niobium, if partial nitriding of niobium is performed after niobium is sintered, capacitors exhibiting a reduced non-uniformity of LC values can be obtained.

Therefore, the capacitor of the present invention is suitable as a compact and high-capacity capacitor for use in general-purpose electronic instruments. Further, the capacitor exhibiting A reduced non-uniformity of LC values is suitable for a smoothing circuit.

What is claimed is:

1. A capacitor comprising two electrodes and a dielectric interposed between the two electrodes, characterized in that the dielectric has a two-layer structure comprising a first layer predominantly comprised of niobium oxide $NbO_x$ (X=2.5) and a second layer predominantly comprised of a mixture of niobium oxide $NbO_x$ (X=2.5) and niobium oxide $NbO_x$ (X=2.0).

2. The capacitor according to claim 1, wherein the content of niobium oxide $NbO_x$ (X=2.5) in the first layer of the dielectric is at least 90% by weight based on the weight of the first layer, and the content of the mixture of niobium oxide $NbO_x$ (X=2.5) and niobium oxide $NbO_x$ (X=2.0) in the second layer of the dielectric is at least 90% by weight based on the weight of the second layer.

3. The capacitor according to claim 2, wherein the ratio of niobium oxide $NbO_x$ (X=2.5) to niobium oxide $NbO_x$ (X=2.0), contained in the second layer of the dielectric, is in the range of 1:4 to 4:1 by mole.

4. The capacitor according to claim 2, wherein the content of the first layer in the two-layer structure is in the range of 0.01% to 10% by volume, based on the volume of the second layer.

5. The capacitor according to claim 2, wherein one of the two electrodes is comprised of niobium or partially nitrided niobium.

6. The capacitor according to claim 1, wherein the ratio of niobium oxide $NbO_x$ (X=2.5) to niobium oxide $NbO_x$ (X=2.0), contained in the second layer of the dielectric, is in the range of 1:4 to 4:1 by mole.

7. The capacitor according to claim 6, wherein the content of the first layer in the two-layer structure is in the range of 0.01% to 10% by volume, based on the volume of the second layer.

8. The capacitor according to claim 6, wherein one of the two electrodes is comprised of niobium or partially nitrided niobium.

9. The capacitor according to claim 1, wherein the content of the first layer in the two-layer structure is in the range of 0.01% to 10% by volume, based on the volume of the second layer.

10. The capacitor according to claim 9, wherein one of the two electrodes is comprised of niobium or partially nitrided niobium.

11. The capacitor according to claim 1, wherein one of the two electrodes is comprised of niobium or partially nitrided niobium.

12. The capacitor according to claim 11, wherein the partially nitrided niobium comprises 10 to 200,000 ppm by weight of bound-nitrogen, based on the weight of the partially nitrided niobium.

13. The capacitor according to claim 12, wherein the partially nitrided niobium is prepared by a process wherein niobium is partially nitrided by treating niobium in a nitrogen atmosphere at a temperature of from room temperature to 2,000° C. for 1 to 50 hours.

14. The capacitor according to claim 12, wherein the other of the two electrodes is comprised of at least one compound selected from group consisting of organic semiconductors end inorganic semiconductors, which have an electrical conductivity of from $10^{-2}$ S·cm$^{-1}$ to $10^3$ S·cm$^{-1}$.

15. The capacitor according to claim 11, wherein the partially nitrided niobium is prepared by a process wherein niobium is partially nitrided by treating niobium in a nitrogen atmosphere at a temperature of from room temperature to 2,000° C. for 1 to 50 hours.

16. The capacitor according to claim 15, wherein the electrode comprised of partially nitrided niobium is made by a process wherein niobium is sintered and then the thus-obtained niobium sintered body is partially nitrided.

17. The capacitor according to claim 16, wherein the other of the two electrodes is comprised of at least one compound selected from group consisting of organic semiconductors and inorganic semiconductors, which have an electrical conductivity of from $10^{-2}$ S·cm$^{-1}$ to $10^3$ S·cm$^{-1}$.

18. The capacitor according to claim 15, wherein the other of the two electrodes is comprised of at least one compound selected from group consisting of organic semiconductors and inorganic semiconductors, which have an electrical conductivity of from $10^{-2}$ S·cm$^{-1}$ to $10^3$ S·cm$^{-1}$.

19. The capacitor according to claim 11, wherein the other of the two electrodes is comprised of at least one compound selected from group consisting of organic semiconductors and inorganic semiconductors, which have an electrical conductivity of from $10^{-2}$ S·cm$^{-1}$ to $10^3$ S·cm$^{-1}$.

20. A process for producing a capacitor comprising two electrodes, one of which comprises a sintered body of partially nitrided niobium, and a dielectric interposed between the two electrodes, characterized in that the dielectric has a two-layer structure comprising a first layer predominantly comprised of niobium oxide $NbO_x$ (X=2.5) and a second layer predominantly comprised of a mixture of niobium oxide $NbO_x$ (X=2.5) and niobium oxide $NbO_x$ (X=2.0), which process comprises sintering a compact of powdery niobium and then allowing the thus-obtained niobium sintered body to stand in a nitrogen atmosphere to partially nitride the niobium sintered body.

21. The process for producing a capacitor according to claim 20, wherein the niobium sintered body is nitrided to an extent such that the content of bound-nitrogen in the partially nitrided niobium sintered body is in the range of 10 to 200,000 ppm by weight.

22. The capacitor according to claim 21, wherein the other of the two electrodes is made of at least one compound selected from the group consisting of organic semiconductors and inorganic semiconductors, which have an electrical conductivity of from $10^{-2}$ S·cm$^{-1}$ to $10^3$ S·cm$^{-1}$.

23. The capacitor according to claim 20, wherein the other of the two electrodes is made of at least one compound selected from the group consisting of organic semiconductors and inorganic semiconductors, which have an electrical conductivity of from $10^{-2}$ S·cm$^{-1}$ to $10^3$ S·cm$^{-1}$.

24. The process for producing a capacitor according to claim 20, which comprises chemically forming the partially nitrided niobium sintered body in an electrolytic solution; or hydrolyzing or thermally decomposing, or hydrolyzing and thermally decomposing a niobium-containing complex on the partially nitrided niobium electrode, to thereby form a niobium oxide layer on the partially nitride niobium sintered body.

\* \* \* \* \*